United States Patent
Fu et al.

(10) Patent No.: US 8,542,321 B2
(45) Date of Patent: Sep. 24, 2013

(54) TV SET AND TV PROGRAM PROCESSING METHOD THEREOF

(75) Inventors: Yaoyuan Fu, Shenzhen (CN); Yihua Chen, Shenzhen (CN); Tongjun Wang, Shenzhen (CN)

(73) Assignee: Shenzhen TCL New Technology Co., Ltd., Shenzhen (CN)

( * ) Notice: Subject to any disclaimer, the term of this patent is extended or adjusted under 35 U.S.C. 154(b) by 13 days.

(21) Appl. No.: 13/379,000

(22) PCT Filed: Jun. 19, 2009

(86) PCT No.: PCT/CN2009/000676
§ 371 (c)(1),
(2), (4) Date: Dec. 16, 2011

(87) PCT Pub. No.: WO2010/145052
PCT Pub. Date: Dec. 23, 2010

(65) Prior Publication Data
US 2012/0092556 A1    Apr. 19, 2012

(51) Int. Cl.
*H04N 5/445* (2011.01)
*H04N 9/74* (2006.01)
*H04N 5/44* (2011.01)

(52) U.S. Cl.
USPC .......................... 348/564; 348/588; 348/734

(58) Field of Classification Search
USPC .............. 348/725, 734, 563–565, 584, 588, 348/586, 598, 599; 725/37, 38, 100, 131, 725/139, 151

IPC .................... H04N 5/44,5/445, 5/45, 9/74, 9/76
See application file for complete search history.

(56) References Cited

U.S. PATENT DOCUMENTS
7,580,080 B2 * 8/2009 Anderson ..................... 348/565

FOREIGN PATENT DOCUMENTS
CN    1897100    1/2007

OTHER PUBLICATIONS
International Search Report of PCT Application No. PCT/CN2009/000676.

* cited by examiner

*Primary Examiner* — Sherrie Hsia

(57) ABSTRACT

A TV set and a TV program processing method thereof are provided in the present disclosure. The TV set includes a control code receiving unit for receiving a control code and a TV program multiple-picture displaying unit for displaying TV program multiple-pictures according to the received control code. The TV program processing method includes the following steps: receiving a control code by a TV set, wherein the control code comprises an instruction of displaying current TV programs in a multiple-picture format; and displaying the current TV programs in the multiple-picture format according to the control code received. The TV set and the TV program processing method thereof of the present disclosure allow for displaying three or more TV programs on a same TV screen simultaneously, and also allow for displaying TV programs according to classifications of contents thereof, making it convenient to watch and use the TV set.

7 Claims, 2 Drawing Sheets

TV SET AND TV PROGRAM PROCESSING METHOD THEREOF

BACKGROUND

1. Technical Field

The present disclosure relates to the field of television, and more particularly, to multiple-picture processing of TV programs.

2. Description of Related Art

Picture-in-picture (PIP) is a new picture displaying mode that appears as TV sets evolve towards large-size screens. When the PIP function is used, the audience who is watching a large picture of a primary channel can monitor or pay attention to a small picture of a secondary channel in which he is interested.

However, the existing TV program processing technology only allows for displaying two TV programs (i.e., displaying the large picture of the primary channel and the small picture of the secondary channel on the same TV screen) simultaneously on a same TV screen, but does not allow for displaying three or more TV programs simultaneously on the TV screen or displaying of TV programs of three or more different channels on a same screen simultaneously according to classifications of TV program contents.

BRIEF SUMMARY

An objective of the present disclosure is to provide a TV set and a TV program processing method thereof, which are intended to overcome the shortcoming of the prior art that three or more TV programs cannot be displayed on a same screen simultaneously according to classifications of contents thereof.

A TV program processing method of the present disclosure includes the following steps of:

step a: receiving a control code by a TV set, wherein the control code includes an instruction of displaying current TV programs in a TV program multiple-picture format; and step b: displaying the current TV programs in the TV program multiple-picture format according to the control code received.

Preferably, the multiple-picture displaying includes three or more pictures.

Preferably, the control code in the step a is transmitted by a TV remote controlling device or triggered by a control panel of the TV set.

Preferably, the step b further includes the following steps of:

step b1: resolving the control code received, wherein data resolved from the control code includes data related to the number of TV program multiple-pictures and TV program content classification displaying data;

step b2: obtaining the number of the current TV programs and a size of a current TV display screen;

step b3: calculating a displaying size of each of the TV program pictures on the TV display screen according to the size of the current TV display screen and the number of TV program multiple-pictures obtained; and calculating the number of scrolling pages of the TV program multiple-pictures displayed on the TV display screen according to the number of TV program multiple-pictures and the number of the current TV programs obtained; and step b4: displaying the TV program multiple-pictures on the TV display screen according to the TV program content classification displaying data.

Preferably, the process of obtaining the number of the current TV programs in the step b2 includes the following step of: obtaining the number of the current TV programs by scanning a PID code received by the TV set.

Preferably, the process of obtaining a size of a current TV display screen in the step b2 includes the following step of: scanning a display profile of the current TV display screen and calculating the size of the TV display screen according to the display profile.

Preferably, when the display profile is of a rectangular form, the size of the current TV display screen is obtained by scanning lengths of two adjacent sides of the rectangular form.

A TV set of the present disclosure includes a control code receiving unit for receiving a control code and a TV program multiple-picture displaying unit configured to display TV program multiple-pictures according to the control code received by the control code receiving unit.

Preferably, the TV program multiple-picture displaying unit further includes a control code resolving unit, a current TV program number obtaining unit, a current TV display screen size obtaining unit, a TV program picture displaying size calculating unit, a TV program multiple-picture scrolling page number calculating unit and a TV program content classification displaying unit.

By use of the TV program multiple-picture displaying unit, the TV set and the TV program processing method thereof of the present disclosure allow for displaying of three or more TV programs on a same TV screen simultaneously, and also allow for displaying of the TV programs according to classifications of contents thereof, which makes it convenient for audiences to watch and use the TV set.

Hereinafter, implementations, functional features and advantages of the present disclosure will be further described with reference to embodiments thereof and the attached drawings.

DETAILED DESCRIPTION

To make the objectives, technical solutions and advantages of the present disclosure clearer, the present disclosure will be further described hereinbelow with reference to the attached drawings and embodiments thereof. It shall be understood that, the embodiments described herein are only intended to illustrate but not to limit the present disclosure.

Figure 1:
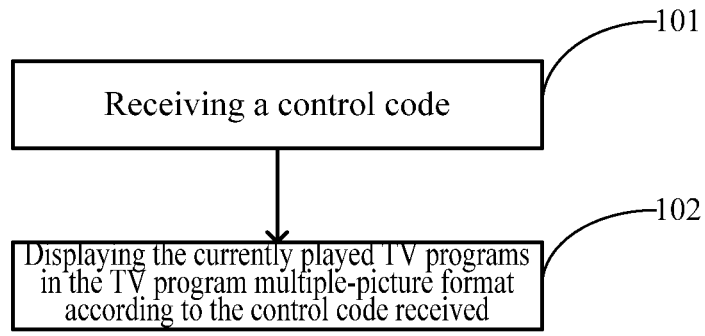
FIG. 1 is a flowchart diagram illustrating a TV program processing method of the present disclosure.

Referring to FIG. 1, a preferred embodiment of a TV program processing method of the present disclosure includes two primary steps 101, 102.

Firstly, step 101 is executed to receive a control code by a TV set. The control code includes an instruction of displaying current TV programs in a TV program multiple-picture format. The current TV programs refer to TV programs that are being current in all channels of the TV set, and a channel corresponds to a TV program. The control code may be transmitted by a TV remote controlling device (e.g., a remote controller) or triggered by a control panel of the TV set.

The control code is transmitted by the TV remote controlling device in the following way. Firstly, a "TV program multiple-picture displaying" menu key is set on the remote controlling device. The "TV program multiple-picture displaying" menu key may be a menu key that is additionally provided to the remote controlling device or a multiplex menu key of the remote controlling device. The "TV program multiple-picture displaying" menu key is configured to transmit the control code to the TV set.

The control code is transmitted by the control panel of the TV set in the following way. Firstly, a "TV program multiple-picture displaying" menu key is set on the control panel of the TV set. The "TV program multiple-picture displaying" menu key may be a menu key that is additionally provided to the control panel or a multiplex menu key of the control panel. The "TV program multiple-picture displaying" menu key is configured to transmit the control code to the TV set.

Figure 2:
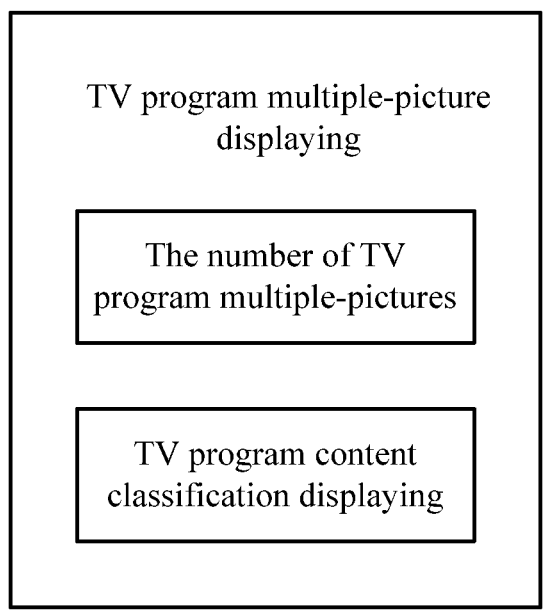
FIG. 2 is a schematic view illustrating submenu items of a TV program multiple-picture displaying menu shown in FIG. 1.

Referring to FIG. 2, optional submenu items of the "TV program multiple-picture displaying" menu comprise: the number of TV program multiple-pictures, and TV program content classification displaying.

Figure 3:
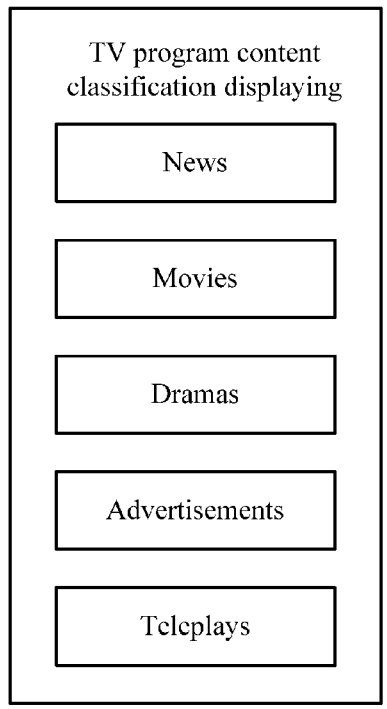
FIG. 3 is a schematic view illustrating submenu items of a TV program content classification displaying menu shown in FIG. 2.

Referring to FIG. 3, optional submenu items of the "TV program content classification displaying" menu shown in FIG. 2 comprise: news, movies, dramas, advertisements, teleplays and the like.

Then, step 102 is executed to display the current TV programs in the TV program multiple-picture format according to the control code received. In this way, TV programs of a plurality of (three or more) different channels can be displayed on the same TV display screen simultaneously according to classifications of TV program contents. For example, if a user chooses to display news according to classifications of contents thereof, then multiple pictures of all news channels are displayed according to the TV program definition made beforehand.

The aforesaid process includes the following steps of:

step I: resolving the control code received, wherein data resolved from the control code includes data related to the number of TV program multiple-pictures and TV program content classification displaying data;

step II: obtaining the number of the current TV programs and a size of a current TV display screen;

step III: calculating a displaying size of each of the TV program pictures on the TV display screen according to the size of the current TV display screen and the number of TV program multiple-pictures obtained; and calculating the number of scrolling pages of the TV program multiple-pictures displayed on the TV display screen according to the number of TV program multiple-pictures and the number of the current TV programs obtained; and step IV: displaying the TV program multiple-pictures on the TV display screen according to the TV program content classification displaying data.

The process of obtaining the number of the current TV programs in the step II includes the following step of: obtaining the number of the current TV programs by scanning a program identifier (PID) code received by the TV set because different TV channels have different PID codes.

The process of obtaining a size of a current TV display screen in the step II includes the following step of: scanning a display profile of the current TV display screen and calculating the size of the TV display screen according to the display profile. For example, when the display profile is of a rectangular form, the size of the current TV display screen can be obtained by scanning lengths of two adjacent sides of the rectangular form.

Figure 4:
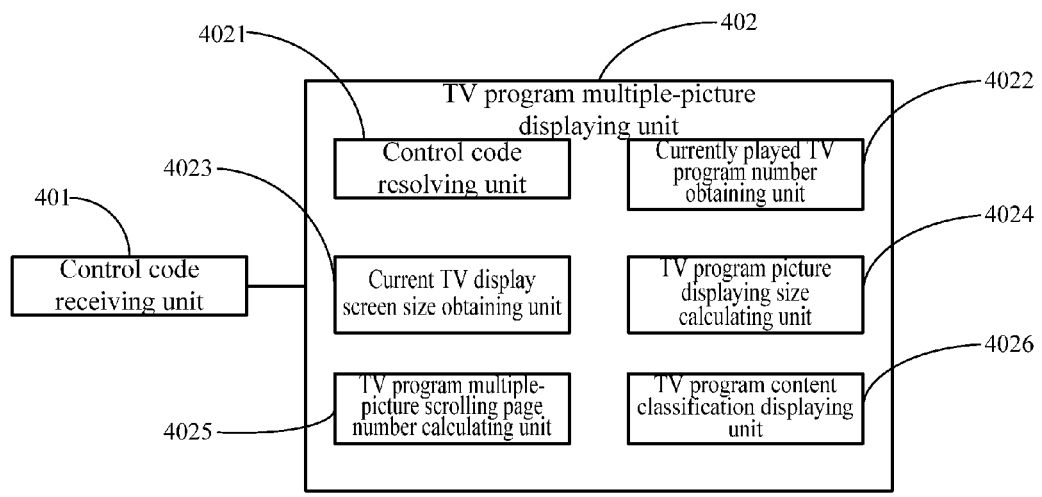
FIG. 4 is a schematic view illustrating a structure of a TV set of the present disclosure.

Referring to FIG. 4, a TV set according to a preferred embodiment of the present disclosure includes a control code receiving unit 401 and a TV program multiple-picture displaying unit 402. The control code receiving unit 401 is configured to receive a control code, and the control code includes a remote control instruction of displaying current TV programs in a TV program multiple-picture format. As described above, the control code received by the control code receiving unit 401 may be transmitted by a TV remote controlling device (e.g., a remote controller) or triggered by a control panel of the TV set.

The TV program multiple-picture displaying unit 402 is configured to display the current TV programs in the TV program multiple-picture format according to the control code received by the control code receiving unit 401. The TV program multiple-picture displaying unit 402 includes a control code resolving unit 4021, a current TV program number obtaining unit 4022, a current TV display screen size obtaining unit 4023, a TV program picture displaying size calculating unit 4024, a TV program multiple-picture scrolling page number calculating unit 4025 and a TV program content classification displaying unit 4026.

The control code resolving unit 4021 is configured to resolve the control code received by the control code receiving unit 401. Data resolved from the control code includes data related to the number of TV program multiple-pictures and TV program content classification displaying data.

The current TV program number obtaining unit 4022 is configured to obtain the number of the current TV programs.

The current TV display screen size obtaining unit 4023 is configured to obtain a size of a current TV display screen.

The TV program picture displaying size calculating unit 4024 is configured to calculate a displaying size of each of the TV program pictures on the TV display screen according to the number of TV program multiple-pictures and the size of the current TV display screen obtained by the current TV display screen size obtaining unit 4023.

The TV program multiple-picture scrolling page number calculating unit 4025 is configured to calculate the number of scrolling pages of the TV program multiple-pictures displayed on the TV display screen according to the number of TV program multiple-pictures and the number of the current TV programs obtained by the current TV program number obtaining unit 4022.

The TV program content classification displaying unit 4026 is configured to display the TV programs on the TV display screen according to the TV program content classification displaying data.

The process of obtaining the number of the current TV programs by the current TV program number obtaining unit 4022 includes the following step of: obtaining the number of the current TV programs by scanning a program identifier (PID) code received by the TV set because different TV channels have different PID codes.

The process of obtaining a size of a current TV display screen by the current TV display screen size obtaining unit 4023 includes the following step of: scanning a display profile of the current TV display screen and calculating the size of the TV display screen according to the display profile. For example, when the display profile is of a rectangular form, the size of the current TV display screen is obtained by scanning lengths of two adjacent sides of the rectangular form.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

What is claimed is:

1. A television (TV) program processing method, comprising the following steps of:
   step a: receiving a control code by a TV set, wherein the control code comprises an instruction of displaying current TV programs in a TV program multiple-picture format; and
   step b: displaying the current TV programs in the TV program multiple-picture format according to the control code received; wherein the step b further comprises the following steps of:
   step b1: resolving the control code received, wherein data resolved from the control code comprises data related to the number of TV program multiple-pictures and TV program content classification displaying data;
   step b2: obtaining the number of the current TV programs and a size of a current TV display screen;
   step b3: calculating a displaying size of each of the TV program pictures on the TV display screen according to the size of the current TV display screen and the number of TV program multiple-pictures obtained; and calculating the number of scrolling pages of the TV program multiple-pictures displayed on the TV display screen according to the number of TV program multiple-pictures and the number of the current TV programs obtained; and
   step b4: displaying the TV program multiple-pictures on the TV display screen according to the TV program content classification displaying data.

2. The TV program processing method of claim 1, wherein the multiple-picture displaying includes three or more pictures.

3. The TV program processing method of claim 1, wherein the control code in the step a is transmitted by a TV remote controlling device or triggered by a control panel of the TV set.

4. The TV program processing method of claim 1, wherein the process of obtaining the number of the current TV programs in the step b2 comprises the following step of: obtaining the number of the current TV programs by scanning a PID code received by the TV set.

5. The TV program processing method of claim 1, wherein the process of obtaining a size of a current TV display screen in the step b2 comprises the following step of: scanning a display profile of the current TV display screen and calculating the size of the TV display screen according to the display profile.

6. The TV program processing method of claim 5, wherein when the display profile is of a rectangular form, the size of the current TV display screen is obtained by scanning lengths of two adjacent sides of the rectangular form.

7. A TV set, comprising a control code receiving unit for receiving a control code, wherein the TV set further comprises a TV program multiple-picture displaying unit configured to display TV program multiple-pictures according to the control code received by the control code receiving unit; a control code resolving unit is configured to resolve the control code received by the control code receiving unit wherein data resolved from the control code comprises data related to the number of TV program multiple-pictures and TV program content classification displaying data; a current TV program number obtaining unit is configured to obtain the number of the current TV programs; a current TV display screen size obtaining unit is configured to obtain a size of a current TV display screen; a TV program picture displaying size calculating unit is configured to calculate a displaying size of each of the TV program pictures on the TV display screen according to the number of TV program multiple-pictures and the size of the current TV display screen obtained by the current TV display screen size obtaining unit; a TV program multiple-picture scrolling page number calculating unit is configured to calculate the number of scrolling pages of the TV program multiple-pictures displayed on the TV display screen according to the number of TV program multiple-pictures and the number of the current TV programs obtained by the current TV program number obtaining unit; a the TV program content classification displaying unit is configured to display the TV programs on the TV display screen according to the TV program content classification displaying data.

* * * * *